(12) United States Patent
Feng

(10) Patent No.: US 11,032,761 B2
(45) Date of Patent: *Jun. 8, 2021

(54) METHOD AND DEVICE FOR SELECTING CAMPING CELL

(71) Applicant: GUANGDONG OPPO MOBILE TELECOMMUNICATIONS CORP., LTD., Guangdong (CN)

(72) Inventor: Bin Feng, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/555,134

(22) Filed: Aug. 29, 2019

(65) Prior Publication Data
US 2019/0387468 A1 Dec. 19, 2019

Related U.S. Application Data

(63) Continuation of application No. 15/741,706, filed as application No. PCT/CN2015/092738 on Oct. 23, 2015.

(51) Int. Cl.
H04W 72/04 (2009.01)
H04W 48/20 (2009.01)
(Continued)

(52) U.S. Cl.
CPC .......... *H04W 48/20* (2013.01); *H04B 17/309* (2015.01); *H04W 72/0453* (2013.01); *H04W 16/14* (2013.01)

(58) Field of Classification Search
CPC ..... H04W 48/20; H04W 72/04; H04W 16/14; H04W 72/0453; H04B 17/309
See application file for complete search history.

(56) References Cited

U.S. PATENT DOCUMENTS

2012/0115529 A1 5/2012 Sun
2013/0034013 A1 2/2013 Jung
(Continued)

FOREIGN PATENT DOCUMENTS

CN 103168491 A 6/2013
CN 103188711 A 7/2013
(Continued)

OTHER PUBLICATIONS

International Search Report in the international application No. PCT/CN2015/092738, dated Jun. 27, 2016.
(Continued)

*Primary Examiner* — Chi Ho A Lee

(57) ABSTRACT

A method and device for selecting a camping cell are provided. The method includes that: terminal equipment measures licensed frequency bands and unlicensed frequency bands according to configuration information, the configuration information including channel signal quality measurement information and/or channel interference level measurement information, wherein the channel quality measurement information may include a Reference Signal Receiving Power (RSRP) parameter and/or a Reference Signal Receiving Quality (RSRQ) parameter, and the channel interference level measurement information may include a Received Signal Strength Indicator (RSSI) parameter; and the terminal equipment determines a camping cell according to a result of measurement over the licensed frequency bands and the unlicensed frequency bands. Therefore, the terminal equipment may camp in a licensed frequency band cell or an unlicensed frequency band cell, and may also achieve optimal access performance between the licensed frequency bands and the unlicensed frequency bands.

20 Claims, 10 Drawing Sheets

(51) Int. Cl.
*H04B 17/309* (2015.01)
*H04W 16/14* (2009.01)

(56) References Cited

U.S. PATENT DOCUMENTS

| | | | |
|---|---|---|---|
| 2013/0121272 A1 | 5/2013 | Barbieri et al. | |
| 2014/0171062 A1 | 6/2014 | Fallgren et al. | |
| 2014/0185497 A1* | 7/2014 | Wolf | H04W 28/26 370/294 |
| 2014/0219181 A1 | 8/2014 | Chun | |
| 2015/0009816 A1 | 1/2015 | Hsu et al. | |
| 2015/0163681 A1* | 6/2015 | Sadek | H04W 16/08 455/446 |
| 2015/0173003 A1 | 6/2015 | Li et al. | |
| 2015/0288475 A1 | 10/2015 | Tabet et al. | |
| 2015/0327133 A1 | 11/2015 | Yiu | |
| 2016/0285578 A1 | 9/2016 | Webb et al. | |
| 2016/0301504 A1 | 10/2016 | Toskala et al. | |
| 2016/0381630 A1 | 12/2016 | Krishnamoorthy et al. | |
| 2017/0055162 A1 | 2/2017 | Takano | |
| 2017/0118758 A1 | 4/2017 | Li | |
| 2017/0223757 A1 | 8/2017 | Tsuboi et al. | |
| 2017/0311374 A1* | 10/2017 | Chang | H04W 36/36 |
| 2017/0325173 A1 | 11/2017 | Webb et al. | |
| 2018/0054725 A1 | 2/2018 | Agiwal et al. | |

FOREIGN PATENT DOCUMENTS

| | | |
|---|---|---|
| CN | 103458462 A | 12/2013 |
| CN | 104486792 A | 4/2015 |
| CN | 104540158 A | 4/2015 |
| CN | 104735729 A | 6/2015 |
| CN | 104780544 A | 7/2015 |
| CN | 104822149 A | 8/2015 |
| CN | 104980966 A | 10/2015 |
| JP | 2013534395 A | 9/2013 |
| JP | 2015109538 A | 6/2015 |
| JP | 2017509209 A | 3/2017 |
| WO | 2014085245 A1 | 6/2014 |
| WO | 2015081984 A1 | 6/2015 |
| WO | 2015108804 A1 | 7/2015 |
| WO | 2015078772 A1 | 8/2015 |
| WO | 2015113226 A1 | 8/2015 |

OTHER PUBLICATIONS

English translation of the Written Opinion of the International Search Authority in the international application No. PCT/CN2015/092738, dated Jun. 27, 2016.
Huawei et al:"RRM measurement requirement for B5C", 3GPP Draft; R2-152252 RRM Measurement Requirement for B5C, 3rd Generation Partnership Project (3GPP), Mobile Competence Centre ; 650, Route Des Lucioles ; F-06921 Sophia-Antipolis Cedex; France, vol. RAN WG2, No. Fukuoka, Japan; 20150525-20150529 May 24, 2015 (May 24, 2015), XP050969773, Retrieved from the Internet: URL: http://www.3gpp.org/ftp/Meetings_3GPP_SYNC/RAN2/Docs/[retrieved on May 24, 2015]* sections 2.1, 2.2 *.
Supplementary European Search Report in the European application No. 15906520.0. dated Mar. 1, 2019.
First Office Action of the Japanese application No. 2018-509554, dated May 17, 2019.
First Office Action of the Chinese application No. 201580081875.1, dated Jun. 10, 2020.
Supplementary European Search Report in the European application No. 20171142.1, dated Jun. 22, 2020.
Intel Corporation; "RSSI measurement for LAA", 3GPP TSG-RAN WG2 Meeting #91bis, R2-154291, Malmö, Sweden, Oct. 5-9, 2015.
Ericsson; "RSSI histogram reporting for LAA", 3GPP TSG-RAN WG2 #91bis, Tdoc R2-154641, Malmö, Sweden, Oct. 5-9, 2015.
Ericsson; "Layer-3 filtering for LAA", 3GPP TSG-RAN WG2 #91bis, Tdoc R2-154644, Malmö, Sweden, Oct. 5-9, 2015.
Ericsson; "Time to Trigger for LAA", 3GPP TSG-RAN WG2 #bis, Tdoc R2-154643, Malmö, Sweden, Oct. 5-9, 2015.
Office Action of the Indian application No. 2018127017134, dated Mar. 20, 2020,
Non-Final Office Action of the U.S. Appl. No. 15/741,706, dated Feb. 6, 2019.
Second Office Action of the Chinese application No. 201580081875.1, dated Feb. 19, 2021.

* cited by examiner

100

A terminal equipment measures licensed frequency bands and unlicensed frequency bands according to configuration information, the configuration information including channel signal quality measurement information and/or channel interference level measurement information, wherein the channel quality measurement information includes an RSRP parameter and/or an RSRQ parameter, and the channel interference level measurement information includes an RSSI parameter ~ S110

The terminal equipment determines a camping cell according to a measurement result of measurement over the licensed frequency bands and the unlicensed frequency bands ~ S120

A network equipment sends configuration information to a terminal equipment, to enable the terminal equipment to measure licensed frequency bands and unlicensed frequency bands according to the configuration information and determine a camping cell according to a measurement result of measurement over the licensed frequency bands and the unlicensed frequency bands, wherein the configuration information includes channel signal quality measurement information and/or channel interference level measurement information, wherein the channel quality measurement information includes an RSRP parameter and/or an RSRQ parameter, and the channel interference level measurement information includes an RSSI parameter ~ S310

FIG. 4

METHOD AND DEVICE FOR SELECTING CAMPING CELL

CROSS REFERENCE TO RELATED APPLICATIONS

This application is a continuation of U.S. application Ser. No. 15/741,706, filed on Jan. 3, 2018, which is the national phase under 35 U.S.C. § 371 of PCT International Application No. PCT/CN2015/092738, filed on Oct. 23, 2015, the entire contents of which are hereby incorporated by reference.

BACKGROUND

At present, using an unlicensed frequency band (for example, 2.4 GHz and 5.8 GHz) to extend a using frequency of a wireless cellular system is started to be considered for the wireless cellular system. Two methods are mainly adopted, i.e. License Assisted Access (LAA) and Long Term Evolution (LTE)/Wireless Fidelity (WiFi) aggregations. The two aggregation methods mainly have the following characteristics: (1) an aggregation resource belongs to an unlicensed frequency band, and is only used as an auxiliary frequency band for an ordinary licensed frequency band; and (2) use of the unlicensed frequency band is not only limited by scheduling of a base station, but also limited by a load of the frequency band, and namely, the unlicensed frequency band may be used through a competition mechanism. Therefore, compared with the licensed frequency band, an access time of a terminal is required to be as short as possible such that the resource of the unlicensed frequency band may be fully utilized within a limited time and a utilization rate of the resource may be increased.

At the present stage, an unlicensed frequency band still exists only as a supplement for a licensed frequency band. For example, in an LAA technology, the unlicensed frequency band may adopt an LTE working mode, but may exist only as a secondary carrier for the licensed frequency band. In the future, LAA may adopt an independent working mode like a Wireless Local Area Network (WLAN). In such case, when a terminal has no data connection and thus is in an idle state, the terminal may camp in a cell using the licensed frequency band or the terminal may camp in a cell using the unlicensed frequency band. However, for accessing to the unlicensed frequency band cell, it is necessary to use a Listen Before Talk (LBT) mechanism for monitoring and detecting a wireless channel and after transmission for a certain period of time in case of successful competition, return to a monitoring state to continue monitoring and completing for the channel like the WLAN. Therefore, performance, such as time delay, packet loss rate and the like of access of the terminal cannot be ensured like the licensed frequency band cell. In spite of this, the unlicensed frequency band also has the advantages of rich frequency band resources, larger bandwidth and the like, and the terminal may flexibly select to access an unlicensed frequency band channel having a better channel condition. Therefore, how to enable a terminal equipment to flexibly camp in a licensed frequency band cell and an unlicensed frequency band cell is a problem to be solved at present.

SUMMARY

Embodiments of the disclosure relate to the field of communications, and more particularly, to a method and device for selecting a camping cell.

The embodiments of the disclosure provide a method and device for selecting a camping cell, which enable a terminal equipment to camp in a licensed frequency band cell or an unlicensed frequency band cell and achieve optimal access performance between licensed frequency bands and unlicensed frequency bands.

In a first aspect, there is provided a method for selecting a camping cell, which may include that: a terminal equipment measures licensed frequency bands and unlicensed frequency bands according to configuration information, the configuration information including channel signal quality measurement information and/or channel interference level measurement information, wherein the channel quality measurement information may include a Reference Signal Receiving Power (RSRP) parameter and/or a Reference Signal Receiving Quality (RSRQ) parameter, and the channel interference level measurement information may include a Received Signal Strength Indicator (RSSI) parameter; and the terminal equipment determines a camping cell according to a result of measurement over the licensed frequency bands and the unlicensed frequency bands.

In a second aspect, there is provided a method for selecting a camping cell, which may include that: a network equipment sends configuration information to a terminal equipment, to enable the terminal equipment to measure licensed frequency bands and unlicensed frequency bands according to the configuration information and determine a camping cell according to a result of measurement over the licensed frequency bands and the unlicensed frequency bands, wherein the configuration information may include channel signal quality measurement information and/or channel interference level measurement information, wherein the channel quality measurement information may include an RSRP parameter and/or an RSRQ parameter, and the channel interference level measurement information may include an RSSI parameter.

In a third aspect, there is provided a terminal equipment, which may include: a measurement module, configured to measure licensed frequency bands and unlicensed frequency bands according to configuration information, the configuration information including channel signal quality measurement information and/or channel interference level measurement information, wherein the channel quality measurement information may include an RSRP parameter and/or an RSRQ parameter, and the channel interference level measurement information may include an RSSI parameter; and a determination module, configured to determine a camping cell according to a result of measurement performed by the measurement module on the licensed frequency bands and the unlicensed frequency bands.

In a fourth aspect, there is provided a network equipment, which may include: a sending module, configured to send configuration information to a terminal equipment to enable the terminal equipment to measure licensed frequency bands and unlicensed frequency bands according to the configuration information and determine a camping cell according to a result of measurement over the licensed frequency bands and the unlicensed frequency bands, wherein the configuration information may include channel signal quality measurement information and/or channel interference level measurement information, wherein the channel quality measurement information may include an RSRP parameter and/or an RSRQ parameter, and the channel interference level measurement information may include an RSSI parameter.

According to the method and device provided by the embodiments of the disclosure for selecting the camping cell, based on the abovementioned technical characteristics, the terminal equipment measures the licensed frequency bands and the unlicensed frequency bands according to the configuration information, and determines the camping cell according to the measurement result, so that the terminal equipment may camp in a licensed frequency band cell or an unlicensed frequency band cell, and may also achieve optimal access performance between the licensed frequency bands and the unlicensed frequency bands.

BRIEF DESCRIPTION OF DRAWINGS

In order to describe the technical solutions of the embodiments of the disclosure more clearly, the drawings referred to in the embodiments of the disclosure will be briefly described below. It is apparent that the drawings described below are only some embodiments of the disclosure. For those skilled in the art, other drawings may further be obtained according to these drawings without creative work.

FIG. 1 is a schematic flowchart illustrating a method for selecting a camping cell according to an embodiment of the disclosure.

FIG. 4 is a schematic flowchart illustrating a method for selecting a camping cell according to yet another embodiment of the disclosure.

DETAILED DESCRIPTION

Figure 2:
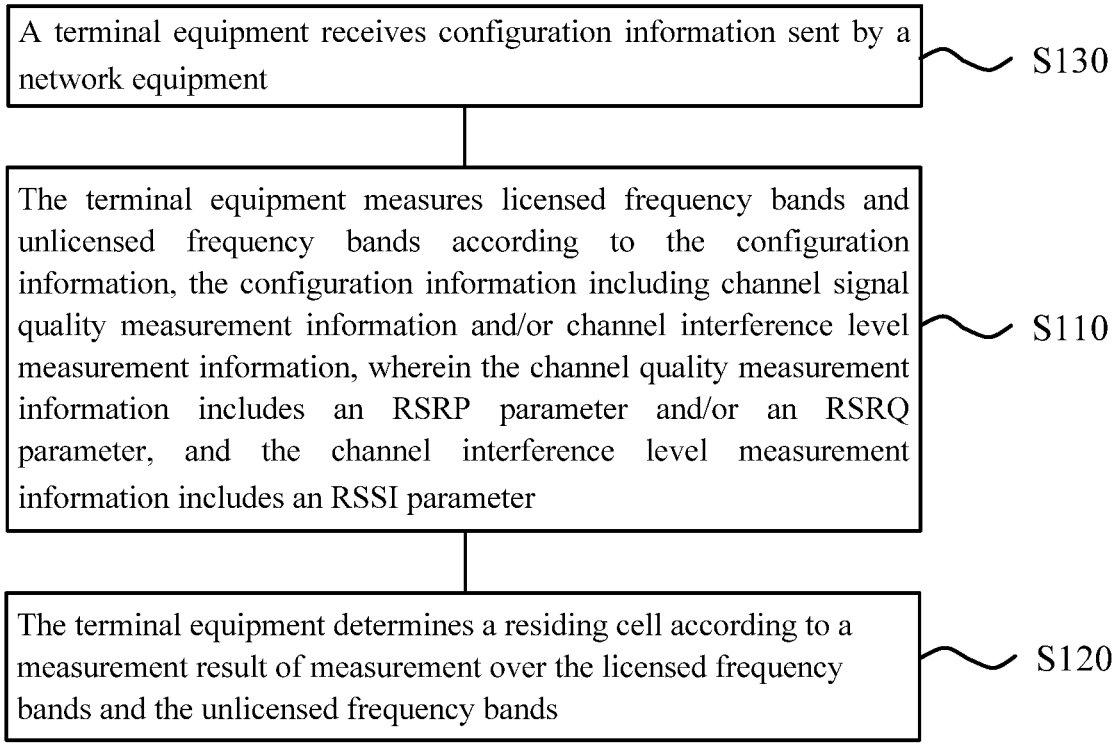
FIG. 2 is another schematic flowchart of a method for selecting a camping cell according to an embodiment of the disclosure.

The technical solutions in the embodiments of the disclosure will be clearly and completely described below in conjunction with the drawings in the embodiments of the disclosure. It is apparent that the described embodiments are not all embodiments but part of embodiments of the disclosure. All other embodiments obtained by those skilled in the art on the basis of the embodiments in the disclosure without creative work shall fall within the scope of protection of the disclosure.

It is to be understood that the technical solutions of the embodiments of the disclosure may be applied to various communication systems, for example, a Global System of Mobile Communication (GSM), a Code Division Multiple Access (CDMA) system, a Wideband Code Division Multiple Access (WCDMA) system, an LTE system, an LTE Frequency Division Duplex (FDD) system, LTE Time Division Duplex (TDD), a Universal Mobile Telecommunication System (UMTS), and a future 5th-Generation (5G) communication system.

It is to be understood that, in the embodiments of the disclosure, a terminal equipment may also be called as User Equipment (UE), a Mobile Station (MS), a mobile terminal or the like. The UE may communicate with one or more core networks through a Radio Access Network (RAN). The UE may be a mobile phone (or called as a cell phone), a computer with a mobile terminal or the like. For example, the UE may be a portable, pocket, handheld, in-computer or vehicle-mounted mobile device, and terminal equipment in a future 5G network or terminal equipment in a future evolved Public Land Mobile Network (PLMN).

It is also be understood that, in the embodiments of the disclosure, a network equipment may be an equipment configured to communicate with the UE. The network equipment may be a Base Transceiver Station (BTS) in a GSM or CDMA, or a NodeB (NB) in a WCDMA system, or an Evolutional Node B (eNB or eNodeB) in an LTE system, or the network equipment may be a relay station, an access point, vehicle-mounted equipment, wearable equipment, network-side equipment in the future 5G network or network equipment in the future evolved PLMN and the like.

It is to be noted that, in the embodiments of the disclosure, a licensed frequency band refers to a frequency band which is exclusively used by a specific system or a specific operating company. The licensed frequency band may also be called as an "ordinary licensed frequency band" or an "authorized frequency band". An unlicensed frequency band refers to a frequency band free and open to the public and shared by different systems. The unlicensed frequency band may also be called as an "unauthorized frequency band" (for example, a 2.4 GHz frequency band and a 5.8 GHz frequency band). However, the scope of protection of the embodiments of the disclosure is not limited to these names.

FIG. 1 is a schematic flowchart illustrating a method for selecting a camping cell according to an embodiment of the disclosure. As illustrated in FIG. 1, the method 100 includes the following operations.

In S110, a terminal equipment measures licensed frequency bands and unlicensed frequency bands according to configuration information. The configuration information include channel signal quality measurement information and/or channel interference level measurement information. Here, the channel quality measurement information includes an RSRP parameter and/or an RSRQ parameter. The channel interference level measurement information includes an RSSI parameter.

In S120, the terminal equipment determines a camping cell according to a result of measurement over the licensed frequency bands and the unlicensed frequency bands.

In such a manner, in the embodiment of the disclosure, the terminal equipment may measure the licensed frequency bands and the unlicensed frequency bands according to the configuration information, and determine the camping cell according to the measurement result. As such, the terminal equipment may camp in a licensed frequency band cell or an unlicensed frequency band cell, and may also achieve optimal access performance between the licensed frequency bands and the unlicensed frequency bands.

It is to be noted that, in the embodiment of the disclosure, licensed frequency band cells refer to cells corresponding to the licensed frequency bands, unlicensed frequency band cells refer to cells corresponding to the unlicensed frequency bands, and measurement over the licensed frequency bands and the unlicensed frequency bands includes measurement over channels of the licensed frequency bands and the unlicensed frequency bands and measurement over the licensed frequency band cells and the unlicensed frequency band cells.

In the embodiment of the disclosure, optionally, the configuration information may be sent to the terminal equipment by network equipment, or the configuration information may be default configuration information which is own by the terminal equipment. The disclosure is not limited thereto.

Optionally, as illustrated in FIG. 2, the method 100 further includes the following operation.

In S130, the terminal equipment receives the configuration information sent by a network equipment.

Optionally, the terminal equipment may receive a broadcast message sent by the network equipment. The broadcast message include the configuration information. Here, the broadcast message may be a broadcast message contained in a Master Information Block (MIB), or is called as an MIB message. Alternatively, the broadcast message may be a broadcast message contained in a System Information Block (SIB), or is called as a SIB message. The broadcast message may be another broadcast message. The disclosure is not limited thereto.

Preferably, the broadcast message is a SIB message. For example, the broadcast message may be a SIB4 message or SIB5 message in an existing communication standard, or may be a newly introduced SIB message, which may be named after for example a SIBX message and different from SIB messages in a conventional art. Specifically, the network equipment may implement inclusion of the configuration information in the SIB4 message or SIB5 message by adding an Information Element (IE) into the SIB4 message or SIB5 message in the conventional art, or may include the IE, which is corresponding to the configuration information, in the new SIB message.

In the embodiment of the disclosure, optionally, the configuration information further includes measurement triggering condition information and/or measurement window information.

Specifically, the measurement triggering condition information may be a measurement period. In such a case, the terminal equipment may measure the licensed frequency bands and the unlicensed frequency bands according to the measurement period. Alternatively, the triggering condition information may also be an event triggering event. For example, the event, which can trigger the measurement, may be that a measured value of a licensed frequency band serving cell is lower than a threshold value, or a measured value of an unlicensed frequency band serving cell is lower than the threshold value.

The measurement window information indicates a time length of each measurement, and a measurement window may be a constant time length, or a variable time length. For example, when a previous measurement result condition is definite, for example, when an RSSI is far higher than or lower than a threshold value, the terminal equipment may use a shorter measurement window. When the previous measurement result condition is poor, that is, when a channel is more complicated (for example, the RSSI is approximate to the threshold value), the measurement window may be correspondingly extended.

In the embodiment of the disclosure, optionally, the configuration information may be configured by a core network and issued to the terminal equipment through Non-Access Stratum (NAS) signaling. In other words, the terminal equipment receives the NAS signaling sent by core network equipment. The NAS signaling include the configuration information.

Preferably, in S110, the configuration information further includes frequency band priority information. The frequency band priority information is configured to indicate ranking of different frequency bands in terms of capability in serving as camping frequency bands for the terminal equipment.

Specifically, the frequency band priority information specifically indicates priorities of the licensed frequency bands and the unlicensed frequency bands and a priority of each unlicensed frequency band in the unlicensed frequency bands.

Correspondingly, when the frequency band priority information indicates that the priority of the unlicensed frequency bands is higher than the priority of the licensed frequency bands, S120 may be specifically implemented as follows: when it is determined that an RSSI value of a first unlicensed frequency band of the unlicensed frequency bands is lower than a first configured threshold value and an RSRP value and/or RSRQ value of at least one unlicensed frequency band cell of unlicensed frequency band cells corresponding to the first unlicensed frequency band are/is higher than a second configured threshold value, the unlicensed frequency band cell with highest quality of the at least one unlicensed frequency band cell is determined as the camping cell.

That is, when the frequency band priorities are configured and the priority of the unlicensed frequency bands is higher than the priority of the licensed frequency bands, frequency band channel selection and cell reselection are performed according to the following flow and corresponding parameters: when RSSI quality, including information of an RSSI mean value, an RSSI occurrence probability and the like, of a certain unlicensed frequency band measured by a terminal is lower than a threshold value A1 and an RSRP/RSRQ value of at least one cell in the frequency band is higher than a threshold value B1, it is judged that the terminal equipment may select to camp in the cell of the frequency band, and otherwise, the terminal equipment may not select to camp in the frequency band. If an RSRP/RSRQ value of only one cell of the cells corresponding to the unlicensed frequency band is higher than the threshold value B1, the cell is determined as a camping cell. If RSRP/RSRQ values of multiple cells of the cells corresponding to the unlicensed frequency band are higher than the threshold value B1, any cell of the multiple cells may be determined as the camping cell. Preferably, the cell with highest quality in the multiple cells is determined as the camping cell.

Optionally, when the frequency band priority information indicates that the priority of each unlicensed frequency band is lower than the priority of each licensed frequency band, S120 may be specifically implemented as follows: when it is determined that RSRP values and/or RSRQ values of licensed frequency band cells corresponding to the licensed frequency bands are lower than a third configured threshold value, an RSSI value of a second unlicensed frequency band of the unlicensed frequency bands is lower than a fourth configured threshold value and an RSRP value and/or RSRQ value of at least one unlicensed frequency band cell of unlicensed frequency band cells corresponding to the second unlicensed frequency band are/is higher than a fifth configured threshold value, the unlicensed frequency band cell with highest quality of the at least one unlicensed frequency band cell is determined as the camping cell.

That is, when the frequency band priorities are configured and the priority of each unlicensed frequency band is lower than the priority of each licensed frequency band, frequency band channel selection and cell reselection are performed according to the following flow and corresponding parameters. When RSRP/RSRQ values of all cells in a licensed frequency band of the terminal equipment are lower than a threshold value C2, RSSI quality, including information of an RSSI mean value, an RSSI occurrence probability and the like, of a certain unlicensed frequency band measured by the terminal is lower than a threshold value A2, and an RSRP/RSRQ value of at least one cell of cells corresponding to the unlicensed frequency band is higher than a threshold value B2, the terminal equipment may select to camp in the cell of the frequency band, and otherwise, the terminal equipment cannot select to camp in the frequency band. If an RSRP/RSRQ value of only one cell of the cells corresponding to the unlicensed frequency band is higher than the threshold value B2, the cell is determined as the camping cell. If RSRP/RSRQ values of multiple cells of the cells corresponding to the unlicensed frequency band are higher than the threshold value B2, any cell of the multiple cells may be determined as the camping cell. Preferably, the cell with highest quality of the multiple cells is determined as the camping cell.

Optionally, when the frequency band priority information indicates that the priority of each unlicensed frequency band is equal to the priority of each licensed frequency band, S120 may be specifically implemented as follows: when it is determined that the RSRP values and/or RSRQ values of the licensed frequency band cells corresponding to the licensed frequency bands are lower than a sixth configured threshold value, an RSSI value of a third unlicensed frequency band of the unlicensed frequency bands is lower than a seventh configured threshold value and an RSRP value and/or RSRQ value of at least one unlicensed frequency band cell of unlicensed frequency band cells corresponding to the third unlicensed frequency band are/is higher than an eighth configured threshold value, the unlicensed frequency band cell with highest quality of the at least one unlicensed frequency band cell is determined as the camping cell.

In other words, when the frequency band priorities are configured and the priority of each unlicensed frequency band is equal to the priority of each licensed frequency band, frequency band channel selection and cell reselection are performed according to the following flow and corresponding parameters. When the RSRP/RSRQ values of all the cells in the licensed frequency band of the terminal equipment are lower than a threshold value C3, RSSI quality, including information of an RSSI mean value, an RSSI occurrence probability and the like, of a certain unlicensed frequency band measured by the terminal is lower than a threshold value A3 and an RSRP/RSRQ value of at least one cell in the frequency band is higher than a threshold value B3, the terminal equipment may select the cell of the frequency band to camp, and otherwise, the terminal equipment may not select the frequency band to camp. If an RSRP/RSRQ value of only one cell of cells corresponding to the unlicensed frequency band is higher than the threshold value B3, the cell is determined as the camping cell. If RSRP/RSRQ values of multiple cells of the cells corresponding to the unlicensed frequency band are higher than the threshold value B3, any cell of the multiple cells may be determined as the camping cell. Preferably, the cell with highest quality in the multiple cells is determined as the camping cell.

Optionally, when the frequency band priorities are not configured, S120 may be specifically implemented as follows: when it is determined that the RSRP values and/or RSRQ values of the licensed frequency band cells corresponding to the licensed frequency bands are lower than a ninth configured threshold value, an RSSI value of a fourth unlicensed frequency band of the unlicensed frequency bands is lower than a tenth configured threshold value and an RSRP value and/or RSRQ value of at least one unlicensed frequency band cell of unlicensed frequency band cells corresponding to the fourth unlicensed frequency band are/is higher than an eleventh configured threshold value, the unlicensed frequency band cell with highest quality of the at least one unlicensed frequency band cell is determined as the camping cell.

That is, when the frequency band priorities are not configured, frequency band channel selection and cell reselection may be performed according to the abovementioned flow and corresponding parameters when the frequency band priorities are configured and the priority of each unlicensed frequency band is lower than the priority of each licensed frequency band.

It is to be understood that the related threshold values mentioned above may be any reasonable numerical values which are set according to practical experiences. The present disclosure is not limited thereto. Moreover, "first", "second" and the like mentioned above are adopted only for distinguishing and not intended to form limits to the described parameters.

It is to be noted that, in the embodiment of the disclosure, quality of the cells may be judged according to RSRQ of the cells, or the quality of the cells may be determined according to RSRP of the cells, or the quality of the cells may be judged according to magnitudes of interferences of the cells, or the quality of the cells may be judged according to comprehensive results of the above parameters. The disclosure is not limited thereto.

Optionally, the terminal equipment in the embodiment of the disclosure may select the camping cell according to a reselection rule that residence in the unlicensed frequency band cells is considered only under the condition that it is impossible to camp in any of licensed frequency band cells. In such a case, the threshold values may be regulated to regulate probabilities that the terminal equipment accesses to the unlicensed frequency band.

In the embodiment of the disclosure, optionally, the terminal equipment may measure the licensed frequency bands or the unlicensed frequency bands by continuously measuring for a certain period of time or continuously measuring for a certain number of times. Correspondingly, when performing cell reselection according to the measurement results, the terminal equipment may make judgments in terms of time period for which the measurement results exceed the threshold value, or number of times for which the measurement results exceed the threshold value, or probability that the measurement results exceed the threshold value. The disclosure is not limited thereto.

In the embodiment of the disclosure, optionally, the configuration information further includes reselection rule information.

Correspondingly, S120 may be specifically implemented as follows: the camping cell is determined according to the result of measurement over the licensed frequency bands and the unlicensed frequency bands and the reselection rule information.

Optionally, the reselection rule information includes an unlicensed frequency band reselection offset and a reselection threshold value. Moreover, one or more unlicensed frequency band reselection offsets and one or more reselection threshold values may be set.

Specifically, the unlicensed frequency band reselection offset may include an RSRQ/RSRP offset Qoffset and/or an RSSI offset Woffset. In such case, the terminal equipment may consider addition of the Qoffset and/or the Woffset when determining the camping cell. A value of the reselection offset may selected to be −3 dB, −2 dB, −1 dB, 0 dB, 1 dB, 2 dB, 3 dB or the like. For example, when the Woffset is considered, the terminal equipment may determine the camping cell according to the following flow. In a certain timer or when a certain number (N) of times is met, if signal quality of an unlicensed frequency band cell is higher than a sum of a threshold value 1 and the Woffset, signal quality of a licensed frequency band cell is lower than a threshold value 2 and an RSSI of an unlicensed frequency band meets occupancy and signal strength mean value requirements, the unlicensed frequency band cell corresponding to the unlicensed frequency band may be selected as the camping cell. Alternatively, under a certain timer condition and/or when the certain number (N) of the times is met, if the signal quality of the unlicensed frequency band cell is higher than a sum of the signal quality of the licensed frequency band and the Woffset, the signal quality of the licensed frequency band cell is lower than the threshold value 2 and the RSSI of the unlicensed frequency band meets the occupancy and signal strength mean value requirements, the unlicensed frequency band cell corresponding to the unlicensed frequency band may be selected as the camping cell.

The method for selecting the camping cell according to the embodiments of the disclosure will be described below in detail with reference to specific embodiments. It is to be noted that these examples are not intended to limit the scope of the embodiments of the disclosure but only to help those skilled in the art to better understand the embodiments of the disclosure.

Figure 3:
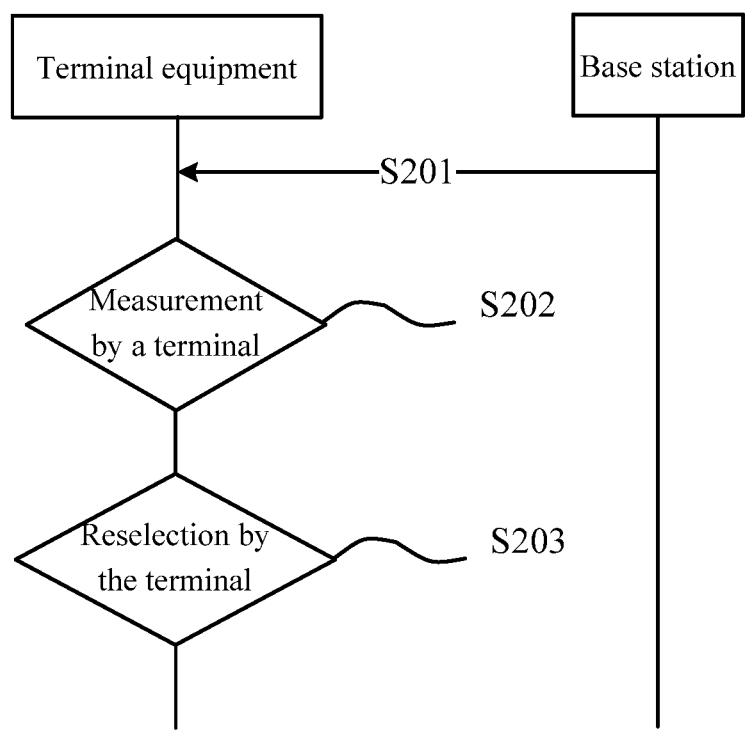
FIG. 3 is a schematic flowchart illustrating a method for selecting a camping cell according to another embodiment of the disclosure.

FIG. 3 is a schematic flowchart illustrating a method for selecting a camping cell according to another embodiment of the disclosure. As illustrated in FIG. 3, the method 200 includes the following operations.

In S201, a base station (eNB) sends a broadcast message to terminal equipment (UE).

Specifically, the broadcast message sent by the base station may include configuration information.

In S202, the terminal equipment measures licensed frequency bands and unlicensed frequency bands according to the broadcast message sent by the base station.

In S203, the terminal equipment performs cell reselection to determine a camping cell according to a result of measurement over the licensed frequency bands and the unlicensed frequency bands.

In such a manner, in the embodiment of the disclosure, the terminal equipment may measure the licensed frequency bands and the unlicensed frequency bands according to the configuration information, and determine the camping cell according to the measurement result. As such, the terminal equipment may camp in a licensed frequency band cell or an unlicensed frequency band cell, and may also achieve optimal access performance between the licensed frequency bands and the unlicensed frequency bands.

The method for selecting the camping cell according to the embodiment of the disclosure has been described above in detail from a terminal equipment side with reference to FIG. 1 to FIG. 3. The method for selecting the camping cell according to another embodiment of the disclosure will be described below in detail from a network equipment side with reference to FIG. 4 and FIG. 5. It is to be understood that interaction between the network equipment and the terminal equipment, related characteristics and functions and the like described on the terminal equipment side correspond to descriptions on the network equipment side. For simplicity, repeated descriptions are properly omitted.

FIG. 4 is a schematic flowchart illustrating a method for selecting a camping cell according to another embodiment of the disclosure. As illustrated in FIG. 4, the method 300 includes the following operation.

In S310, a network equipment sends configuration information to a terminal equipment, to enable the terminal equipment to measure licensed frequency bands and unlicensed frequency bands according to the configuration information and determine a camping cell according to a result of measurement over the licensed frequency bands and the unlicensed frequency bands.

Here, the configuration information includes channel signal quality measurement information and/or channel interference level measurement information. Here, the channel quality measurement information includes an RSRP parameter and/or an RSRQ parameter. The channel interference level measurement information includes an RSSI parameter.

In such a manner, in the embodiment of the disclosure, the network equipment sends the configuration information to the terminal equipment, to enable the terminal equipment to measure the licensed frequency bands and the unlicensed frequency bands according to the configuration information and determine the camping cell according to the result of measurement. As such, the terminal equipment may camp in a licensed frequency band cell or an unlicensed frequency band cell, and may also achieve optimal access performance between the licensed frequency bands and the unlicensed frequency bands.

Optionally, in S310, the configuration information further includes frequency band priority information. The frequency band priority information may indicate ranking of different frequency bands in terms of capability in serving as camping frequency bands for the terminal equipment.

Optionally, in S310, the configuration information further includes reselection rule information, and the terminal equipment determines the camping cell according to the result of measurement over the licensed frequency bands and the unlicensed frequency bands and the reselection rule information.

In the embodiment of the disclosure, optionally, the reselection rule information includes an unlicensed frequency band reselection offset and/or a reselection threshold value.

Optionally, S310 may be specifically implemented as follows: a broadcast message is sent to the terminal equipment. The broadcast message include the configuration information.

In the embodiment of the disclosure, optionally, the network equipment may send a SIB message to the terminal equipment. Optionally, the SIB message is a SIB4 message or a SIB5 message.

Optionally, in S310, the configuration information further includes measurement triggering condition information and/or measurement window information.

In such a manner, in the embodiment of the disclosure, the network equipment sends the configuration information to the terminal equipment, to enable the terminal equipment to measure the licensed frequency bands and the unlicensed frequency bands according to the configuration information and determine the camping cell according to the result of measurement over the licensed frequency bands and the unlicensed frequency bands. As such, the terminal equipment may camp in the licensed frequency band cell or the unlicensed frequency band cell, and may also achieve the optimal access performance between the licensed frequency bands and the unlicensed frequency bands.

Figure 5:
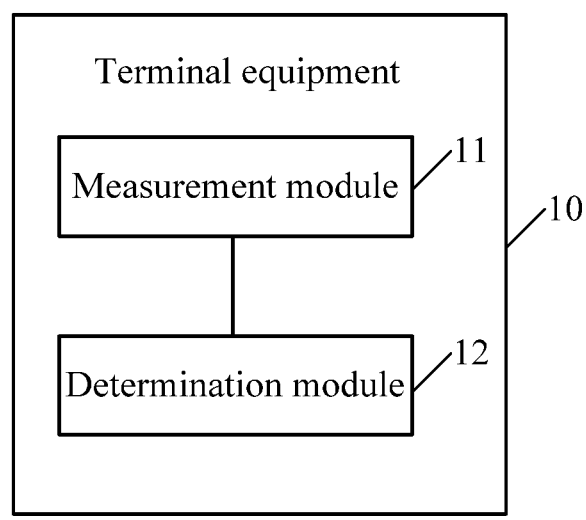
FIG. 5 is a schematic block diagram illustrating a terminal equipment according to an embodiment of the disclosure.

FIG. 5 is a schematic block diagram illustrating a terminal equipment according to an embodiment of the disclosure. As illustrated in FIG. 5, the terminal equipment 10 includes a measurement module 11 and a determination module 12.

The measurement module 11 is configured to measure licensed frequency bands and unlicensed frequency bands according to configuration information. The configuration information includes channel signal quality measurement information and/or channel interference level measurement information. The channel quality measurement information includes an RSRP parameter and/or an RSRQ parameter. The channel interference level measurement information includes an RSSI parameter.

The determination module 12 is configured to determine a camping cell according to a result of measurement performed by the measurement module 11 on the licensed frequency bands and the unlicensed frequency bands.

In such a manner, the terminal equipment of the embodiment of the disclosure may measure the licensed frequency bands and the unlicensed frequency bands according to the configuration information, and determine the camping cell according to the measurement result. As such, the terminal equipment may camp in a licensed frequency band cell or an unlicensed frequency band cell, and may also achieve optimal access performance between the licensed frequency bands and the unlicensed frequency bands.

In the embodiment of the disclosure, optionally, the configuration information further includes frequency band priority information. The frequency band priority information may indicate ranking of different frequency bands in terms of capability in serving as camping frequency bands for the terminal equipment.

In the embodiment of the disclosure, optionally, the frequency band priority information may indicate that a priority of each unlicensed frequency band is higher than a priority of each licensed frequency band.

Here, when determining the camping cell according to the result of measurement over the licensed frequency bands and the unlicensed frequency bands, the determination module 12 may be specifically configured to:

when it is determined that an RSSI value of a first unlicensed frequency band of the unlicensed frequency bands is lower than a first configured threshold value and an RSRP value and/or RSRQ value of at least one unlicensed frequency band cell of unlicensed frequency band cells corresponding to the first unlicensed frequency band are/is higher than a second configured threshold value, determine the unlicensed frequency band cell with highest quality of the at least one unlicensed frequency band cell as the camping cell.

In the embodiment of the disclosure, optionally, the frequency band priority information may indicate that the priority of each unlicensed frequency band is lower than the priority of each licensed frequency band.

Here, when determining the camping cell according to the result of measurement over the licensed frequency bands and the unlicensed frequency bands, the determination module 12 may be specifically configured to:

when it is determined that RSRP values and/or RSRQ values of licensed frequency band cells corresponding to the licensed frequency bands are lower than a third configured threshold value, an RSSI value of a second unlicensed frequency band of the unlicensed frequency bands is lower than a fourth configured threshold value and an RSRP value and/or RSRQ value of at least one unlicensed frequency band cell of unlicensed frequency band cells corresponding to the second unlicensed frequency band are/is higher than a fifth configured threshold value, determine the unlicensed frequency band cell with highest quality of the at least one unlicensed frequency band cell as the camping cell.

In the embodiment of the disclosure, optionally, the frequency band priority information may indicate that the priority of each unlicensed frequency band is equal to the priority of each licensed frequency band.

Here, when determining the camping cell according to the result of measurement over the licensed frequency bands and the unlicensed frequency bands, the determination module 12 may be specifically configured to:

when it is determined that the RSRP values and/or RSRQ values of the licensed frequency band cells corresponding to the licensed frequency bands are lower than a sixth configured threshold value, an RSSI value of a third unlicensed frequency band of the unlicensed frequency bands is lower than a seventh configured threshold value and an RSRP value and/or RSRQ value of at least one unlicensed frequency band cell of unlicensed frequency band cells corresponding to the third unlicensed frequency band are/is higher than an eighth configured threshold value, determine the unlicensed frequency band cell with highest quality of the at least one unlicensed frequency band cell as the camping cell.

In the embodiment of the disclosure, optionally, when determining the camping cell according to the result of measurement over the licensed frequency bands and the unlicensed frequency bands, the determination module 12 may be specifically configured to:

when it is determined that the RSRP values and/or RSRQ values of the licensed frequency band cells corresponding to the licensed frequency bands are lower than a ninth configured threshold value, an RSSI value of a fourth unlicensed frequency band of the unlicensed frequency bands is lower than a tenth configured threshold value and an RSRP value and/or RSRQ value of at least one unlicensed frequency band cell of unlicensed frequency band cells corresponding to the fourth unlicensed frequency band are/is higher than an eleventh configured threshold value, determine the unlicensed frequency band cell with highest quality of the at least one unlicensed frequency band cell as the camping cell.

In the embodiment of the disclosure, optionally, the configuration information further includes reselection rule information.

Here, when determining the camping cell according to the result of measurement over the licensed frequency bands and the unlicensed frequency bands, the determination module 12 may be specifically configured to:

determine the camping cell according to the result of measurement over the licensed frequency bands and the unlicensed frequency bands and the reselection rule information.

In the embodiment of the disclosure, optionally, the reselection rule information includes an unlicensed frequency band reselection offset and/or a reselection threshold value.

Figure 6:
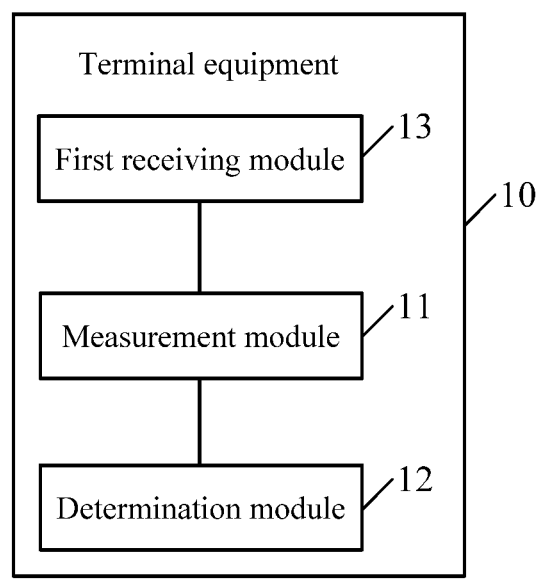
FIG. 6 is another schematic block diagram illustrating a terminal equipment according to an embodiment of the disclosure.

In the embodiment of the disclosure, optionally, as illustrated in FIG. 6, the terminal equipment may further include a first receiving module 13.

The first receiving module 13 may be configured to receive the configuration information sent by a network equipment.

In the embodiment of the disclosure, optionally, when receiving the measurement configuration information sent by the network equipment, the first receiving module 13 may be specifically configured to:

receive a SIB message sent by the network equipment, the SIB message including the configuration information.

In the embodiment of the disclosure, optionally, when receiving the SIB message sent by the network equipment, the first receiving module 13 may be specifically configured to:

receive a SIB4 message or SIB5 message sent by the network equipment.

Figure 7:
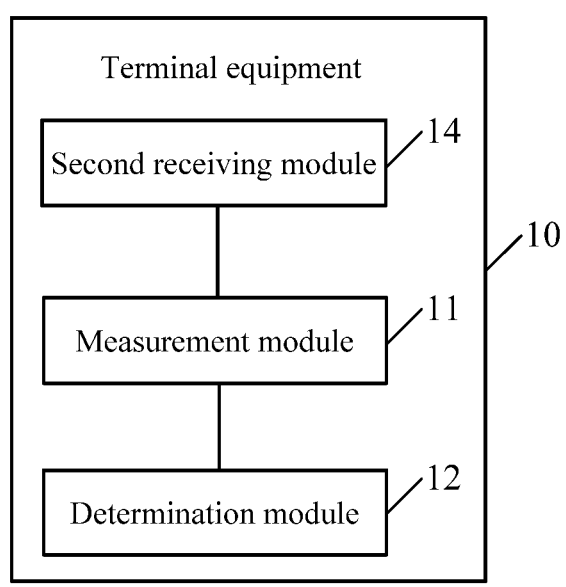
FIG. 7 is another schematic block diagram illustrating a terminal equipment according to an embodiment of the disclosure.

In the embodiment of the disclosure, optionally, as illustrated in FIG. 7, the terminal equipment further includes a second receiving module 14.

The second receiving module 14 is configured to receive NAS signaling sent by core network equipment. The NAS signaling include the configuration information.

In the embodiment of the disclosure, optionally, the configuration information further includes measurement triggering condition information and/or measurement window information.

In such a manner, the terminal equipment of the embodiment of the disclosure may measure the licensed frequency bands and the unlicensed frequency bands according to the configuration information, and determine the camping cell according to the measurement result. As such, the terminal equipment may camp in the licensed frequency band cell or the unlicensed frequency band cell, and may also achieve the optimal access performance between the licensed frequency bands and the unlicensed frequency bands.

Figure 8:
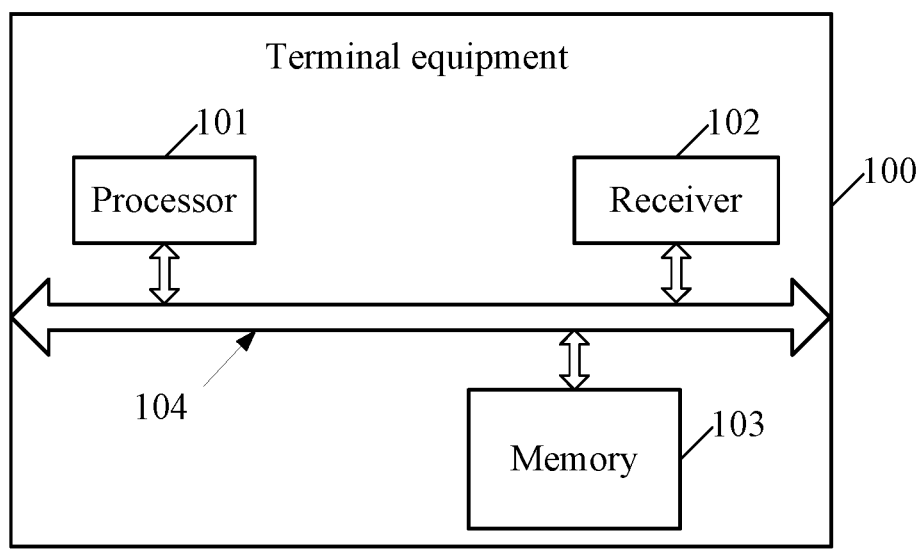
FIG. 8 is a schematic block diagram illustrating a terminal equipment according to another embodiment of the disclosure.

It is to be noted that, in the embodiment of the disclosure, the measurement module 11 and the determination module 12 may be implemented by a processor, and the first receiving module 13 and the second receiving module 14 may be implemented by a receiver or receivers. As illustrated in FIG. 8, a terminal equipment 100 may include a processor 101, a receiver 102 and a memory 103. Here, the memory 103 may be configured to store codes executed by the processor 101 and the like, and the processor 101 is configured to execute the codes stored in the memory 103 and control the receiver 102 to receive a signal.

Various components in the terminal equipment 100 are coupled together through a bus system 104. Here, the bus system 104 includes a data bus, and further includes a power bus, a control bus and a state signal bus.

The terminal equipment 10 illustrated in FIG. 5 to FIG. 7 or the terminal equipment 100 illustrated in FIG. 8 may implement various processes implemented in the method embodiments in FIG. 1 and FIG. 2, and for avoiding repetition, will not be elaborated herein.

Figure 9:
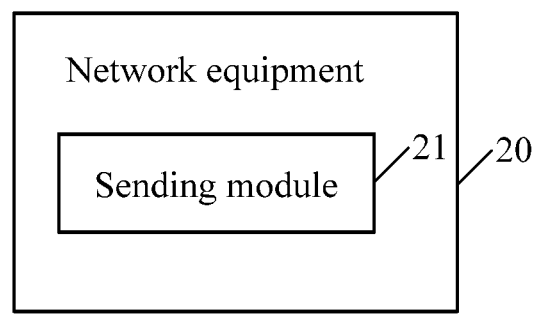
FIG. 9 is a schematic block diagram illustrating a network equipment according to an embodiment of the disclosure.

FIG. 9 is a schematic block diagram illustrating a network equipment according to an embodiment of the disclosure. As illustrated in FIG. 9, the network equipment 20 includes a sending module 21.

The sending module 21 is configured to send configuration information to a terminal equipment, to enable the terminal equipment to measure licensed frequency bands and unlicensed frequency bands according to the configuration information and determine a camping cell according to a result of measurement over the licensed frequency bands and the unlicensed frequency bands.

Here, the configuration information includes channel signal quality measurement information and/or channel interference level measurement information. Here, the channel quality measurement information includes an RSRP parameter and/or an RSRQ parameter. The channel interference level measurement information includes an RSSI parameter.

In such a manner, the network equipment of the embodiment of the disclosure sends the configuration information to the terminal equipment, to enable the terminal equipment to measure the licensed frequency bands and the unlicensed frequency bands according to the configuration information and determine the camping cell according to the result of measurement over the licensed frequency bands and the unlicensed frequency bands. As such, the terminal equipment may camp in a licensed frequency band cell or an unlicensed frequency band cell, and may also achieve optimal access performance between the licensed frequency bands and the unlicensed frequency bands.

In the embodiment of the disclosure, optionally, the configuration information further includes frequency band priority information, and the frequency band priority information is configured to indicate ranking of different frequency bands in terms of capability in serving as camping frequency bands for the terminal equipment.

In the embodiment of the disclosure, optionally, the configuration information further includes reselection rule information, and the terminal equipment determines the camping cell according to the result of measurement over the licensed frequency bands and the unlicensed frequency bands and the reselection rule information.

In the embodiment of the disclosure, optionally, the reselection rule information includes an unlicensed frequency band reselection offset and/or a reselection threshold value.

In the embodiment of the disclosure, optionally, when sending the configuration information to the terminal equipment, the sending module 11 may be specifically configured to:

send a broadcast message to the terminal equipment, the broadcast message including the configuration information.

In the embodiment of the disclosure, optionally, when sending the broadcast message to the terminal equipment, the sending module 11 may be specifically configured to:

send a SIB message to the terminal equipment.

In the embodiment of the disclosure, optionally, when sending the SIB message to the terminal equipment, the sending module 11 may be specifically configured to:

send a SIB4 message or a SIB5 message to the terminal equipment.

In the embodiment of the disclosure, optionally, the configuration information further includes measurement triggering condition information and/or measurement window information.

In such a manner, the network equipment of the embodiment of the disclosure sends the configuration information to the terminal equipment, to enable the terminal equipment to measure the licensed frequency bands and the unlicensed frequency bands according to the configuration information and determine the camping cell according to the result of measurement over the licensed frequency bands and the unlicensed frequency bands. As such, the terminal equipment may camp in the licensed frequency band cell or the unlicensed frequency band cell, and may also achieve the optimal access performance between the licensed frequency bands and the unlicensed frequency bands.

Figure 10:
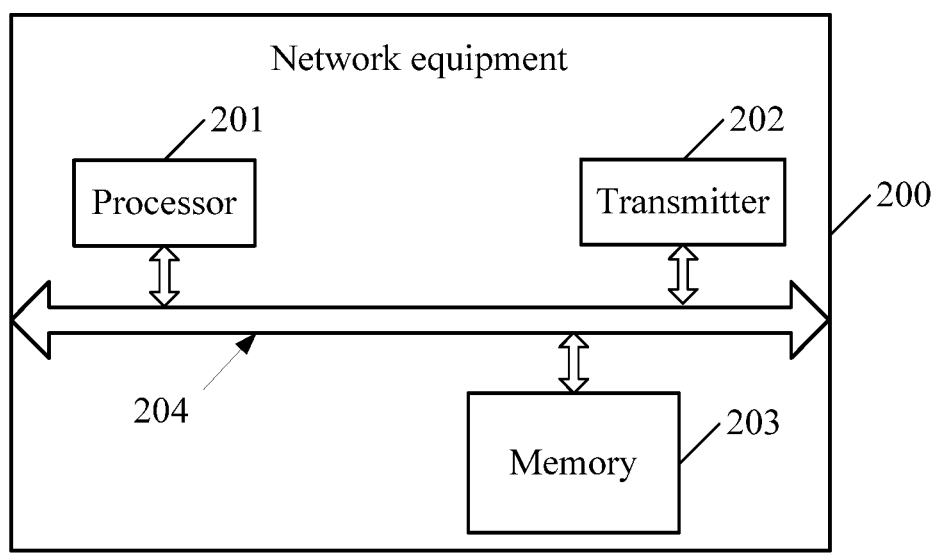
FIG. 10 is a schematic block diagram illustrating a network equipment according to another embodiment of the disclosure.

It is to be noted that, in the embodiment of the disclosure, the sending module 11 may be implemented by a transmitter. As illustrated in FIG. 10, a network equipment 200 may include a processor 201, a transmitter 202 and a memory 203. Here, the memory 203 may be configured to store codes executed by the processor 201 and the like. The processor 201 is configured to execute the codes stored in the memory 203 and control the transmitter 202 to send a signal.

Various components in the network equipment 200 are coupled together through a bus system 204. The bus system 204 includes a data bus, and further includes a power bus, a control bus and a state signal bus.

The network equipment 20 illustrated in FIG. 9 or the network equipment 200 illustrated in FIG. 10 may implement various processes implemented in the method embodiment in FIG. 4, and for avoiding repetition, will not be elaborated herein.

Those skilled in the art may realize that the units and algorithm steps of each example described in conjunction with the embodiments disclosed in the disclosure may be implemented by electronic hardware, computer software or a combination thereof. Whether these functions are executed in a hardware or software manner depends on specific applications and design constraints of the technical solutions. Those skilled in the art may implement the described functions for each specific application by virtue of different methods, but such implementation shall fall within the scope of the disclosure.

Those skilled in the art may clearly appreciate that specific working processes of the system, device and unit described above may refer to the corresponding processes in the method embodiment for convenient and brief description and will not be elaborated herein.

In some embodiments provided by the disclosure, it is to be understood that the disclosed system, device and method may be implemented in another manner. For example, the device embodiment described above is only schematic. For example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may be distributed to multiple network units. Part or all of the units may be selected to achieve the purpose of the solutions of the embodiments according to a practical requirement.

In addition, various function units in various embodiments of the disclosure may be integrated into a processing unit, various units may also exist independently, and two or more than two units may also be integrated into a unit.

When being implemented in form of software function unit and sold or used as an independent product, the function may also be stored in a computer-readable storage medium. Based on such an understanding, the technical solutions of the disclosure substantially or parts making contributions to the conventional art or part of the technical solutions may be embodied in form of software product. The computer software product is stored in a storage medium, including a plurality of instructions configured to enable a piece of computer equipment (which may be a personal computer, a server, network equipment or the like) to execute all or part of the steps of the method in each embodiment of the disclosure. The abovementioned storage medium includes: various medium capable of storing program codes such as a U disk, a removable hard disk, a Read-Only Memory (ROM), a Random Access Memory (RAM), a magnetic disk or an optical disk.

The above is only the specific implementation of the disclosure and not intended to limit the scope of protection of the disclosure. Any variations or substitution apparent to those skilled in the art within the technical scope disclosed by the disclosure shall fall within the scope of protection of the disclosure. Therefore, the scope of protection of the disclosure shall be defined by the scope of protection of the claims.

The invention claimed is:

1. A method for cell selection and reselection for a camping cell, comprising:
   measuring, by an idle terminal equipment, licensed frequency bands and unlicensed frequency bands according to configuration information, the configuration information comprising signal quality measurement configuration and/or interference level measurement configuration, wherein the signal quality measurement configuration comprises at least one of Reference Signal Receiving Power (RSRP) measurement configuration and/or a Reference Signal Receiving Quality (RSRQ) measurement configuration, and the interference level measurement configuration comprises a Received Signal Strength Indicator (RSSI) measurement configuration; and
   when it is determined that the RSRP values and/or RSRQ values of the licensed frequency band cells corresponding to the licensed frequency bands are lower than a ninth configured threshold value, an RSSI value of a fourth unlicensed frequency band of the unlicensed frequency bands is lower than a tenth configured threshold value and an RSRP value and/or RSRQ value of at least one unlicensed frequency band cell of unlicensed frequency band cells corresponding to the fourth unlicensed frequency band are/is higher than an eleventh configured threshold value, determining the unlicensed frequency band cell with highest quality of the at least one unlicensed frequency band cell as the camping cell.

2. The method according to claim 1, wherein the configuration information further comprises reselection rule information,
   wherein determining the camping cell according to the result of measurement over the licensed frequency bands and the unlicensed frequency bands comprises:
   determining the camping cell according to the result of measurement over the licensed frequency bands and the unlicensed frequency bands and the reselection rule information.

3. The method according to claim 2, wherein the reselection rule information comprises an unlicensed frequency band reselection offset and/or a reselection threshold value.

4. The method according to claim 1, further comprising:
   receiving the configuration information sent by a network equipment.

5. The method according to claim 4, wherein receiving the measurement configuration information sent by the network equipment comprises:
   receiving a System Information Block (SIB) message sent by the network equipment, the SIB message comprising the configuration information,
   wherein receiving the SIB message sent by the network equipment comprises:
   receiving a SIB4 message or SIB5 message sent by the network equipment.

6. The method according to claim 1, further comprising:
receiving, the terminal equipment, Non-Access Stratum (NAS) signaling sent by core network equipment, the NAS signaling comprising the configuration information.

7. The method according to claim 1, wherein the configuration information further comprises measurement triggering condition information and/or measurement window information.

8. The method according to claim 7, wherein the measurement window information comprises a constant time length and a variable time length, and indicates a time length of each measurement.

9. The method according to claim 1, further comprising: measuring for a period of time or measuring for a predetermined number of times during measuring licensed frequency bands and unlicensed frequency bands.

10. A method for cell selection and reselection for a camping cell, comprising:
sending, by network equipment, configuration information to a terminal equipment to enable the terminal equipment to measure licensed frequency bands and unlicensed frequency bands according to the configuration information and to determine a camping cell according to a result of measurement over the licensed frequency bands and the unlicensed frequency bands,
wherein the configuration information comprises signal quality measurement configuration and/or interference level measurement configuration, wherein the signal quality measurement configuration comprises at least one of Reference Signal Receiving Power (RSRP) measurement configuration and/or a Reference Signal Receiving Quality (RSRQ) measurement configuration, and the interference level measurement configuration comprises a Received Signal Strength Indicator (RSSI) measurement configuration;
wherein after receiving the configuration information from network equipment, when it is determined that the RSRP values and/or RSRQ values of the licensed frequency band cells corresponding to the licensed frequency bands are lower than a ninth configured threshold value, an RSSI value of a fourth unlicensed frequency band of the unlicensed frequency bands is lower than a tenth configured threshold value and an RSRP value and/or RSRQ value of at least one unlicensed frequency band cell of unlicensed frequency band cells corresponding to the fourth unlicensed frequency band are/is higher than an eleventh configured threshold value, the unlicensed frequency band cell with highest quality of the at least one unlicensed frequency band cell is determined as the camping cell.

11. The method according to claim 10, wherein the configuration information further comprises frequency band priority information, the frequency band priority information indicating ranking of different frequency bands in terms of capability in serving as camping frequency bands for the terminal equipment.

12. The method according to claim 10, wherein the configuration information further comprises reselection rule information, and the terminal equipment determines the camping cell according to the result of measurement over the licensed frequency bands and the unlicensed frequency bands and the reselection rule information.

13. The method according to claim 12, wherein the reselection rule information comprises an unlicensed frequency band reselection offset and/or a reselection threshold value.

14. The method according to claim 10, wherein sending the configuration information to the terminal equipment comprises:
sending a broadcast message to the terminal equipment, the broadcast message comprising the configuration information.

15. The method according to claim 14, wherein sending the broadcast message to the terminal equipment comprises:
sending a System Information Block (SIB) message to the terminal equipment,
wherein sending the SIB message to the terminal equipment comprises: sending a SIB4 message or a SIB5 message to the terminal equipment.

16. The method according to claim 10, wherein the configuration information further comprises measurement triggering condition information and/or measurement window information.

17. The method according to claim 16, wherein the measurement window information comprises a constant time length and a variable time length, and indicates a time length of each measurement.

18. The method according to claim 10, wherein the licensed frequency bands and the unlicensed frequency bands is measured for a period of time or for a predetermined number of times.

19. A terminal equipment, comprising:
one or more processors; and
a memory for storing instructions executable by the one or more processors;
wherein the one or more processors are configured to:
measure licensed frequency bands and unlicensed frequency bands according to configuration information, the configuration information comprising signal quality measurement configuration and/or interference level measurement configuration, wherein the signal quality measurement configuration comprises a Reference Signal Receiving Power (RSRP) measurement configuration and/or a Reference Signal Receiving Quality (RSRQ) measurement configuration, and the interference level measurement configuration comprises a Received Signal Strength Indicator (RSSI) measurement configuration; and
when it is determined that the RSRP values and/or RSRQ values of the licensed frequency band cells corresponding to the licensed frequency bands are lower than a ninth configured threshold value, an RSSI value of a fourth unlicensed frequency band of the unlicensed frequency bands is lower than a tenth configured threshold value and an RSRP value and/or RSRQ value of at least one unlicensed frequency band cell of unlicensed frequency band cells corresponding to the fourth unlicensed frequency band are/is higher than an eleventh configured threshold value, determine the unlicensed frequency band cell with highest quality of the at least one unlicensed frequency band cell as the camping cell.

20. The terminal equipment according to claim 19, the one or more processors are further configured to: measure for a period of time or measure for a predetermined number of times during measuring licensed frequency bands and unlicensed frequency bands.

* * * * *